ns010478006B2

United States Patent
Dogan et al.

(10) Patent No.: US 10,478,006 B2
(45) Date of Patent: *Nov. 19, 2019

(54) CAPSULE HOLDER OR AN ADAPTER FOR ADAPTING A CAPSULE IN A CAPSULE HOLDER IN A BEVERAGE PREPARATION MACHINE

(75) Inventors: Nihan Dogan, La Croix-sur-Lutry (CH); Frederic Doleac, Vaux et Chantegrue (FR); Stephane Hentzel, Yvonand (CH); HansPeter Pleisch, Corseaux (CH); Marc Raederer, Le Mont-sur-Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 290 days.

This patent is subject to a terminal disclaimer.

(21) Appl. No.: 13/811,589

(22) PCT Filed: Jul. 20, 2011

(86) PCT No.: PCT/EP2011/062448
§ 371 (c)(1),
(2), (4) Date: Jan. 22, 2013

(87) PCT Pub. No.: WO2012/010630
PCT Pub. Date: Jan. 26, 2012

(65) Prior Publication Data
US 2013/0118360 A1    May 16, 2013

(30) Foreign Application Priority Data
Jul. 22, 2010 (EP) .................................. 10170492

(51) Int. Cl.
*A47J 31/06* (2006.01)
(52) U.S. Cl.
CPC ....... *A47J 31/0642* (2013.01); *A47J 31/0678* (2013.01)

(58) Field of Classification Search
CPC .................... A47J 31/0642; A47J 31/0678
(Continued)

(56) References Cited

U.S. PATENT DOCUMENTS 5,347,916 A * 9/1994 Fond ................... A47J 31/0668
                                                99/295
6,026,732 A * 2/2000 Kollep et al. ................... 99/295
(Continued)

FOREIGN PATENT DOCUMENTS

| EP | 0512470 | 11/1992 |
| EP | 0870457 | 10/1998 |
| WO | 2006/111890 | 10/2006 |

OTHER PUBLICATIONS

European Search Report dated Apr. 4, 2011 for European Appln. No. 10170492.

*Primary Examiner* — Dana Ross
*Assistant Examiner* — Ket D Dang
(74) *Attorney, Agent, or Firm* — K&L Gates LLP

(57) ABSTRACT

The present invention relates to a capsule holder (10) or an adapting device (17) for adapting a capsule (1) into a capsule holder (10), the capsule (1) being designed for delivering a food product by injection of a fluid under pressure into the capsule, said capsule comprising a chamber (3) defined by capsule side walls (4), a flexible bottom wall (5) comprising at least one dispensing opening (9) and a top wall (6), said chamber containing at least one ingredient to be dissolved and/or extracted by said injection fluid, wherein said capsule holder (10) or adapting device (17) comprises a pressure retaining element (11) disposed in the vicinity of the bottom wall (5), which comprises at least one protrusion (12) in correspondence to said at least one dispensing opening (9) so that said protrusion (12) is disposed into the corresponding opening (9) and restricts its diameter at the time injection (Continued)

fluid inside the capsule chamber moves said membrane towards said pressure retaining means.

12 Claims, 2 Drawing Sheets

(58) Field of Classification Search
 USPC ..... 99/295, 279, 289 D, 292, 301, 316, 323, 99/323.3, 302 R, 290, 284, 291; 426/115, 426/77, 431, 394, 82, 295, 323, 302 R, 426/79, 80, 112
 See application file for complete search history.

(56) References Cited

U.S. PATENT DOCUMENTS

| | | | | |
|---|---|---|---|---|
| 6,832,542 | B2* | 12/2004 | Hu | A47J 31/0668 99/295 |
| 7,059,239 | B2* | 6/2006 | Balkau | A47J 31/0673 99/295 |
| 7,464,636 | B2* | 12/2008 | Mariller | 99/295 |
| 7,617,763 | B2* | 11/2009 | Chen | A47J 31/0626 99/289 R |
| 8,685,479 | B2* | 4/2014 | Dogan | B65D 85/8043 426/115 |
| 2004/0163543 | A1 | 8/2004 | Hu | |
| 2005/0150390 | A1* | 7/2005 | Schifferle | B65D 85/8043 99/295 |
| 2005/0150391 | A1* | 7/2005 | Schifferle | A47J 31/0673 99/295 |
| 2005/0160919 | A1* | 7/2005 | Balkau | A47J 31/0673 99/279 |
| 2006/0107841 | A1* | 5/2006 | Schifferle | A47J 31/0668 99/279 |
| 2006/0130664 | A1* | 6/2006 | Majer Doglioni | A47J 31/0642 99/275 |
| 2006/0174769 | A1* | 8/2006 | Favre | A47J 31/0668 99/275 |
| 2006/0219098 | A1* | 10/2006 | Mandralis et al. | 99/279 |
| 2007/0202237 | A1* | 8/2007 | Yoakim et al. | 426/590 |
| 2009/0126577 | A1* | 5/2009 | Ternite | A47J 31/0673 99/295 |
| 2009/0175986 | A1* | 7/2009 | Doglioni Majer | B65D 85/8043 426/77 |
| 2009/0211458 | A1 | 8/2009 | Denisart et al. | |
| 2010/0034929 | A1* | 2/2010 | Dogan et al. | 426/89 |
| 2010/0064899 | A1* | 3/2010 | Aardenburg | A47J 31/3633 99/295 |
| 2010/0107889 | A1* | 5/2010 | Denisart | A47J 31/3695 99/295 |

* cited by examiner

CAPSULE HOLDER OR AN ADAPTER FOR ADAPTING A CAPSULE IN A CAPSULE HOLDER IN A BEVERAGE PREPARATION MACHINE

CROSS REFERENCE TO RELATED APPLICATIONS

The present application is a National Stage of International Application No. PCT/EP2011/062448, filed on Jul. 20, 2011, which claims priority to European Patent Application No. 10170492.2, filed Jul. 22, 2010, the entire contents of which are being incorporated herein by reference.

FIELD OF THE INVENTION

The present invention concerns a capsule for the preparation of food products, for instance, the preparation of beverages of the coffee type, which require high extraction and/or dissolution pressure by a fluid injected in the capsule.

BACKGROUND OF THE INVENTION

In the rest of the present specification, the invention will be described in reference to beverages preparation, more particularly coffee. However, this should not be taken as limiting the scope of the present specification and claims. The present invention is generally directed to the preparation of any food or nutritional product that can be prepared by injection of a fluid into a capsule or pod in a food preparation machine, and which involves a high fluid pressure inside the capsule to extract or dissolve the ingredient(s) contained therein. Such food or nutritional products can include for instance soluble coffee and/or powdered roast and ground coffee beans, dairy products, such as milk preparation, infant milk, soups, ice cream, chocolate-based products, teas or herbal infusions, semi-liquid or liquid desserts.

Capsules containing a substance for the preparation of beverages such as coffee, by extraction or mixing at high pressure are well known, particularly in the domain of espresso coffee, or soluble coffee preparation, and are particularly interesting from a hygiene perspective, as well as for the product freshness it guarantees. Consumer friendliness and ease of preparation is also a particular advantage of such systems.

In some cases, the capsule is held in a capsule holder which holds the said capsule and allows proper insertion and adaptation into the receptacle of a food preparation device. Beyond the insertion and adaptation practicality aspects, the capsule holder guarantees that internal fluid pressure inside the capsule chamber does not damage the capsule walls, and for this reason, the capsule holder is shaped and dimensioned so as to tightly fit the capsule walls.

Recently, many different types of machines and systems for food preparation using capsules or pods have been marketed, each comprising a capsule or pod with a specific shape and/or size. In order to allow a consumer to fit capsules or pods designed for one system, into another system not initially designed to work with such capsule or pod design, adapting devices have been developed which allow a consumer to adapt a given type of capsule or pod into the capsule holder of another system, while guaranteeing the same safety and practicality characteristics of the native system, such adapting devices have been described for instance in the not yet published patent application n° EP AN 10168128.6.

The capsules may be closed capsules serving as a chamber for the injection of water and opening in order to release the liquid beyond a certain pressure threshold by means of the rupturing of a face of the capsule in contact with elements that are in relief. Alternatively, some capsules are used which comprise fluid inlet and/or product outlet openings which are pre-existing at the time the user introduces the said capsule into the food preparation machine.

Water is usually injected by means of perforation through the capsule using a needle or spikes. An example of an extraction system of this type is described in Patent EP 0 512 470 B1 or, alternatively, EP 0 870 457. In the as yet another possible alternative, the capsule has its own release-type means for rupturing a capsule film or membrane and thereby releasing the liquid extract when a pressure threshold has been achieved inside the capsule.

The capsules may also be permeable chambers of the filter type or, alternatively, semi-permeable chambers comprising a filter component.

In all cases, internal pressure in the capsule chamber is a main driver for the creation of foam in dissolution products and for the creation of cream—i.e. crema—for powdered roast and ground coffee. It is also the main driver for creation of crema in ground coffee extraction. Crema is very important for consumers as it provides controlled aroma release as well as for its own mouth feel.

It is known to use substances to be mixed (soluble or dispersible substances) and substances to be extracted under pressure using the same machine so as to offer a wider variety of beverages. For example, on using one and the same machine, it is possible to prepare an "espresso" coffee when the capsule contains a ground coffee.

The injection, mixing or wetting conditions have a considerable influence on the quality of the beverage produced. Depending on whether a substance, resulting from grinding, pressed down into a capsule is involved, or, alternatively, a substance to be dissolved or dispersed in a liquid, such as a soluble coffee or a milk-based substance such as a cappuccino, or the like is involved, the way in which the water circulates through the capsule has an influence on the extraction or mixing conditions and thus on the final quality of the beverage.

Thus, a product such as coffee has to be dissolved or dispersed rapidly and completely, producing preferably foam with a specific texture. In the case of products to be extracted, such as ground coffee, the optimum wetting conditions are different. The product must be thoroughly wetted, thereby optimizing the water/coffee contact surface, without creating preferred routes for the water through the bed of coffee. The creation of a privileged route through the bed of coffee may result in too sudden an increase in pressure and thus too rapid a release of the extract despite the fact that the extraction time is insufficient and part of the coffee has not yet been correctly wetted.

There is a need for a tool that can accommodate a capsule for insertion of the said capsule into a food preparation machine, that can control the flow of product through the capsule outlet when said capsule is open, so that the pressure inside the capsule is kept at a consistent level during the whole extraction and/or dissolution step, while still allowing a proper dispensing of the product.

SUMMARY OF THE INVENTION

The objectives set out above are met by the present invention with a capsule holder or an adapting device for adapting a capsule into a capsule holder, the said capsule being designed for delivering a food product by injection of a fluid under pressure into the capsule when said capsule and capsule holder and optionally said adapting device are inserted into a receptacle of a food preparation machine, said capsule comprising:

a chamber defined by capsule side walls, a flexible bottom wall and optionally a top wall, said chamber containing at least one ingredient to be dissolved and/or extracted by said injection fluid, and a beverage dispensing structure comprising at least one dispensing opening disposed through the bottom wall, characterized in that said capsule holder or said adapting device for said capsule holder comprises a pressure retaining element adapted to retain a certain predetermined dissolution and/or extraction pressure in the chamber for the mixing of said injection fluid with said ingredient, and disposed in the vicinity of the bottom wall outside of the chamber, said pressure retaining element comprising at least one protrusion disposed in correspondence to said at least one dispensing opening so that said protrusion is disposed into the corresponding opening and restricts its section, at least at the time injection fluid inside the capsule chamber presses onto the bottom membrane and moves said membrane towards said pressure retaining element.

By "capsule", it is not meant only rigid but this also encompasses soft pods such as paper filter pods of different shapes and sizes, or a combination of rigid and soft parts.

By restricting, but not closing completely the outlet openings of the capsule, the flow of product is guaranteed, yet simultaneously the pressure inside the capsule is kept sufficiently high to allow a proper wetting, dissolution, foaming and/or extraction of the material contained inside the capsule.

In one particular embodiment of the invention, at least one protrusion of the pressure retaining element has a radial cross-sectional shape that differs from the shape of the opening it corresponds to. Alternatively, or in addition, the protrusion can have a general longitudinal profile such that its radial cross section generally increases from apex to base.

In the latter case where the radial cross section of a protrusion generally increases from apex to base, said protrusion can advantageously have a general shape chosen from the following: an hemisphere, a truncated hemisphere, an elliptical paraboloid, a thorn-like cone, a polyhedron such as a tetrahedron, a truncated tetrahedron, a cone, a truncated cone, a pyramid, a truncated pyramid, or a combination thereof. Of course, other similar shape can be applied, as long as the principle of radial cross-section increase from apex to base of the protrusion applies.

With such a shape, it is ensured that the product—for e.g. coffee—extracted and/or dissolved inside the coffee chamber can flow out of the capsule through the dispensing holes of the capsule bottom wall, and that the dispensing holes are not fully clogged by the corresponding protrusions.

During extraction and/or dissolution, as injection fluid is injected into the capsule chamber, pressure inside the said chamber builds up, pressing the bottom wall of the capsule towards the pressure retaining means, so that the dispensing openings of the bottom wall are partially obstructed by the protrusions. The distance between the bottom membrane and the pressure retaining means—particularly the base of the protrusions—is adapted so that when the highest pressure inside the capsule is reached, the deformation of the bottom membrane does not exceed a point where the dispensing holes would be clogged.

Preferably, the radial cross section at the base portion of the protrusions is not greater than the diameter of the dispensing openings they correspond to, and the distance between said protrusion base and the bottom membrane of the capsule is greater than 0.1 mm, more preferably greater 0.2 mm, at maximum deformation of the said bottom membrane. The open area for product flow can be adjusted using the viscosity of the product and according to the pressure needed for the type of product. For instance, pressure can be pre adjusted to provide the type of foam preferred by the consumer for a specific milk based product. For instance, smooth creamy textured foam/emulsion composed of small bubbles in milk foam can be achieved with a smaller open area with preferably less than 1.0 mm distance.

In any case, if the radial cross section at the base portion of the protrusions is greater than the diameter of the dispensing openings they correspond to, then the maximum deformation point of the capsule bottom membrane shall be adapted such that each dispensing opening of the membrane is not clogged by the corresponding protrusion when the pressure inside the capsule reaches its highest point.

In a preferred embodiment of the present invention, the pressure retaining element comprises at least one cushion disposed in the vicinity of said at least one protrusion, said cushion having a height smaller than, or equal to, said protrusion, for maintaining the capsule bottom wall at a distance from the protrusion base if said bottom wall is moved under the influence of fluid pressure inside the capsule, such that the diameter of said opening is greater than the radial cross-section of the protrusion it corresponds to.

In one embodiment of the invention, the said at least one dispensing opening of the capsule is pre-pierced in the capsule bottom wall at the time said capsule is placed in said capsule holder or in said adapting device for use with the food preparation machine.

In a second alternative embodiment of the invention, the said at least one opening is created through the capsule bottom wall thickness by:

local dissolution of the capsule bottom wall material upon effect of temperature of the injection fluid when said fluid contacts the internal surface of said bottom wall, and/or upon chemical reaction between the bottom wall material and the injection fluid, and/or effect of the fluid pressure inside the capsule chamber onto a predetermined area of the bottom wall, which is pre-pierced but in a closed position and opens after local deformation of the bottom wall, or which is a weakened area of the bottom wall, and/or effect of mechanical means disposed outside of said capsule, onto said capsule bottom wall. By "in correspondence" is meant that the symmetrical axis of the protrusion is substantially aligned with the centre of the dispensing opening.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
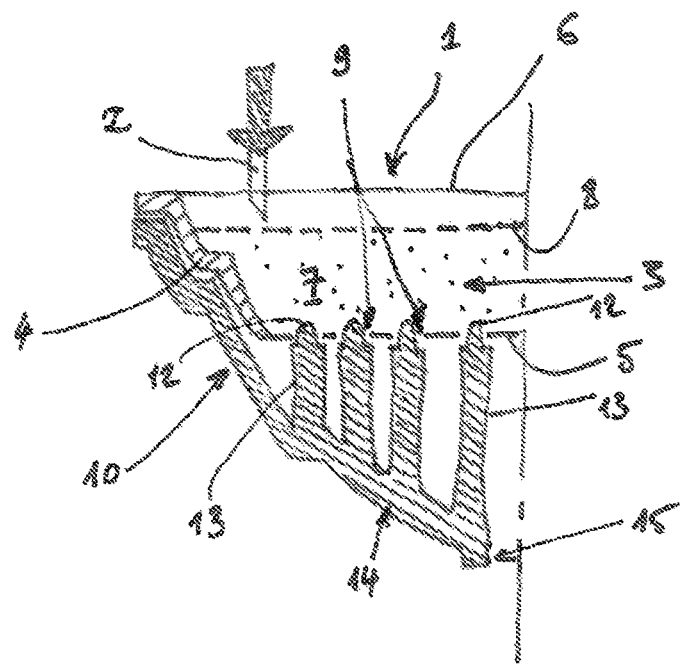
FIG. 1 is a schematic profile partial cut view of a capsule, placed in a capsule holder according to the invention.

FIG. 1 illustrates a first embodiment of the invention, wherein a capsule 1 is provided that is suitable for delivering a food product by injection of a fluid under pressure through a needle 2, into the capsule when said capsule is inserted into a receptacle of a food preparation machine—not illustrated in the drawing—. The capsule 1 comprises a chamber 3 defined by capsule side walls 4, a flexible bottom wall 5 and a top wall 6.

The chamber 3 contains a mass of powdered roast and ground coffee 7 to be extracted by said injection fluid under pressure. The mass of coffee 7 is enclosed in the chamber 3 between the bottom side 5 of the capsule, and a filter wall 8 which is disposed parallel to, yet at a certain distance below the top wall 6 of the capsule. This filter wall 8 has at least two advantages: it breaks the jet of water expelled from the injection needle 2 and slows down the speed of water, and it keeps the powdered coffee 7 under a certain compressed configuration so that the coffee mass is held together and so that the water injected into the capsule chamber does not spill the powder through the capsule chamber volume, which is highly undesirable.

As shown in FIG. 1, the capsule 1 further comprises beverage dispensing structure, with a plurality of dispensing openings 9 disposed through the bottom wall 5.

As shown in FIG. 1, the capsule is accommodated in a cup-shaped capsule holder 10. The capsule holder 10 comprises a pressure retaining element 11 disposed beneath the bottom wall 5 of the capsule 1, outside of the chamber 3.

Said pressure retaining element 11 comprises a plurality of protrusions 12 disposed in correspondence to said the dispensing openings 9, so that each protrusion 12 is disposed into the corresponding opening 9 and restricts its section, at least at the time injection fluid inside the capsule chamber 3 presses onto the bottom membrane 5 and moves said membrane towards said pressure retaining means 11. As shown in FIG. 1, each protrusion 12 is mounted on a rod 13, which extends upwardly from the bottom wall 14 of the capsule holder.

The capsule holder 10 further comprises a dispensing opening 15, through which the product prepared inside the capsule chamber 3 and dispensed through dispensing openings 9 of the bottom membrane 5 can flow.

Figure 2:
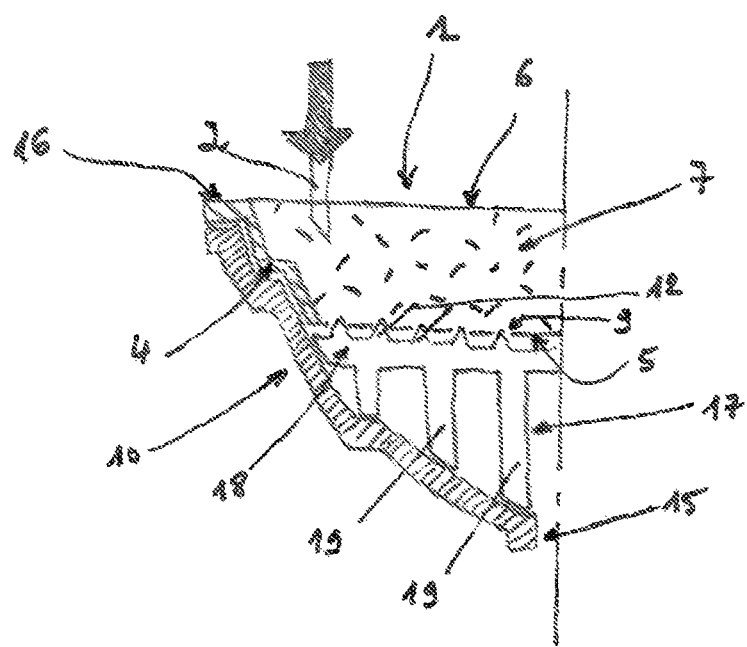
FIG. 2 is a schematic profile cut view of an alternative embodiment of the invention.

Turning to FIG. 2, a capsule is shown in cut schematic view. The capsule as presented comprises a cup-shaped body with side walls 4 and an upper edge 16. On the drawing, the upper side of the capsule is closed with a membrane 6 that is pierceable to let the injection needle 2 in. The capsule 1 further comprises a bottom membrane 5 pierced with a plurality of dispensing holes 9. The capsule is filled with a pure soluble coffee product mass 7. In order to guarantee the product freshness during storage, the capsule is stored into a secondary packaging, for instance a flow wrap sachet made of a light, moisture, and gas tight material (not illustrated in the drawing).

In this particular embodiment, the pressure retaining element 11 is a part of an adapting device 17 that allows adapting the capsule external shape to the internal shape of the capsule holder 10.

More precisely, the adapting device 17 comprises an upper wall 18, with carrying pillars 19 that extend downwardly from the upper wall 18 to the lower side of the capsule holder 10. When extraction fluid is injected inside the capsule chamber 3, the pressure inside the capsule raises, and presses outwardly onto the capsule walls 4, 5, 6. If a capsule that is inserted into the capsule holder, has a shape and/or size that does not fit properly the capsule holder, the capsule walls are not correctly held during the extraction process when internal pressure builds up in the capsule chamber. This leads to a risk of damage or explosion of the capsule, of course highly undesirable. To obviate this problem, an adapting device can be used that holds the capsule walls and ensures that no deformation occurs during pressure build-up that may damage the capsule.

In the example illustrated in FIG. 2, the capsule shape is such that its bottom wall 5 would normally be located at a distance from the corresponding bottom wall of the capsule holder, when said capsule is disposed in said capsule holder, with risks of damage to the capsule during extraction, as explained above. In this case, the capsule bottom wall 5 is held in position whatever the internal pressure in the capsule chamber 3, by the upper wall 18 of the adapting device 17.

According to the invention and as illustrated in FIG. 2, the upper wall 18 of the adapting device comprises a pressure retaining element 11 with a plurality of protrusions 12.

As illustrated in FIG. 2, the bottom wall 5 of the capsule is a flexible membrane that is pierced with multiple dispensing holes 9, similar to the embodiment already described with reference to FIG. 1. This membrane can be a pierced film, a mesh, a paper filter, or similar air and liquid permeable material.

As explained above in reference with FIG. 1, the protrusions 12 are shaped and sized so that they fit the openings 9 of the bottom wall 5, in such a way that each protrusion 12 is disposed into the corresponding opening 9 and restricts its section, at least at the time injection fluid inside the capsule chamber 3 presses onto the bottom membrane 5 and moves said membrane towards said pressure retaining element 11.

The pressure retaining element 11 comprises a series of channels—not shown in the drawing—allowing the product prepared inside the capsule to flow towards a dispensing opening 15 of the capsule holder, for instance into a cup.

Figure 3:
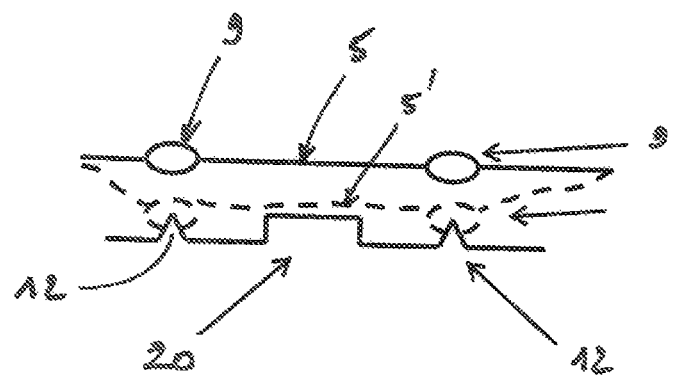
FIG. 3 is a schematic enlarged profile view of pressure retaining means according to the invention.

FIG. 3 is an enlarged partial schematic view showing the structural relationship between the bottom flexible membrane 5 of the capsule 1 and the pressure retaining element 11.

As can be seen in the FIG. 3, the bottom membrane 5 comprises a plurality of dispensing openings 9. Correspondingly, the pressure retaining element 11 comprises a plurality of cone-shaped protrusions 12 pointing towards the openings 9.

In the embodiment shown in FIG. 3, the general longitudinal profile of the protrusions 12 is such that their radial cross section generally increases from apex to base.

When fluid is injected inside the capsule, pressure builds-up inside the capsule chamber, and as a result, the flexible bottom membrane 5 is pressed outwardly, towards the wall 16 of the pressure retaining element 11. The position of the deformed membrane at this point is represented in FIG. 3 in dotted lines.

The positioning of the flexible bottom membrane 5 in the rest state should be such that, depending on the flexibility of the material that is used for manufacturing this membrane, and depending on the maximum pressure level inside the capsule during the product preparation, the position of the deformed membrane 5' should be as illustrated in FIG. 3, i.e. the protrusions 12 should partially fill the space defined by the openings 9, without completely clogging them. In this position, the flow of output product is restricted, thus allowing the pressure inside the capsule chamber to be maintained at a sufficient level for the extraction and/or dissolution to be qualitatively good. Also, the wetting of the ingredient or ingredients contained inside the capsule and meant to be extracted and/or dissolved is good, due to the fact that the flow of output product is slowed down.

The positioning of the membrane 5, relative to the pressure retaining means wall 16 is also determined by the size and shape of the protrusions 12.

In a particularly advantageous working mode of the present invention, the pressure retaining means 11 further comprises at least one, but preferably a plurality of supporting cushions 20 that protrude in the same direction as the protrusions 11.

As shown in FIG. 3, a supporting cushion 20 supports the bottom membrane 5' of the capsule in its deformed state, to guarantee that the said membrane 5' does not go beyond a certain position where it would be completely clogged by the protrusions 12 of the pressure retaining element 11. In that extreme position, the membrane 5' rests onto the cushions 20. Said cushions are preferably disposed in between the protrusions, and their height does not exceed the height of the protrusions 12.

As shown in FIG. 3, the cushions can have a cylindrical shape, but other similar shapes can also be applied, such as mushroom-like, truncated-cone, truncated pyramid, cubic, etc, or a combination thereof. The cushions 20 are disposed such that they do are not aligned with dispensing openings 9 of the bottom membrane 5.

As an alternative to the embodiment shown in FIG. 3, it is possible to restrict the flow of product out of the dispensing openings of the bottom membrane in another way. In one case—not represented in the drawing—the pressure retaining element does not comprise cushions as previously described. In this case, the cross section of the protrusions does not vary from apex to base. In this case, the regulation/restriction of the product flow through the dispensing openings of the capsule is obtained by the difference of radial cross-sectional shape between the dispensing openings and their corresponding protrusions. For instance, if a dispensing opening has a circular shape, the corresponding protrusion can be designed to have a cross or triangular shape in the radial plan. As the radial shapes do not fit exactly, vertical channels are created through which the product can flow, although the said flow is restricted so as to maintain a substantial internal pressure in the capsule chamber.

Ideally, the flow restriction according to the present invention should be made such that the internal pressure inside the capsule chamber is kept as constant as possible throughout product dispensing.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A capsule holder configured for holding a capsule in a food preparation machine, the capsule being designed for delivering a food product by injection of a fluid under pressure into the capsule when the capsule and capsule holder are inserted into a receptacle of the food preparation machine, the capsule comprising a chamber defined by capsule side walls, a top wall, and a flexible bottom wall, the chamber containing at least one ingredient to be dissolved or extracted by the injection fluid, wherein a beverage dispensing structure comprises at least one dispensing opening disposed through the flexible bottom wall, the capsule holder comprising:
a plurality of pillars extending vertically from the flexible bottom wall to an internal wall of the capsule holder to hold the flexible bottom wall at a distance from the internal wall of the capsule holder, and
a pressure retaining element adapted to retain a certain predetermined dissolution or extraction pressure in the chamber for mixing of the injection fluid with the ingredient, the pressure retaining element being located adjacent the flexible bottom wall outside of the capsule, the pressure retaining element comprising at least one protrusion positioned in correspondence to the at least one dispensing opening so that the at least one protrusion is disposed into the at least one dispensing opening corresponding thereto and that the at least one protrusion restricts a cross section of the at least one dispensing opening corresponding thereto, at least at the time the injection fluid inside the chamber presses onto the flexible bottom wall and moves the flexible bottom wall towards the pressure retaining element, wherein the at least one protrusion has a radial cross-sectional shape that differs from a shape of the at least one dispensing opening corresponding thereto, and wherein the at least one protrusion has a general longitudinal profile such that a radial cross section of the at least one protrusion continually increases from apex to base.

2. The capsule holder of claim 1, wherein the at least one protrusion has a general shape selected from the group consisting of a hemisphere, a truncated hemisphere, an elliptical paraboloid, a thorn-like cone, a polyhedron, a truncated tetrahedron, a cone, a truncated cone, a pyramid, a truncated pyramid, and combinations thereof.

3. The capsule holder of claim 1, wherein the pressure retaining element comprises at least one cushion located in the vicinity of the at least one protrusion, the cushion having a height smaller than, or equal to, the at least one protrusion, for maintaining the flexible bottom wall at a distance from a protrusion base when the flexible bottom wall is moved due to fluid pressure inside the capsule, such that a diameter of the at least one dispensing opening is greater than the radial cross-section of the at least one protrusion it corresponds to.

4. The capsule holder of claim 1, wherein the at least one protrusion partially fills the cross section of the at least one dispensing opening corresponding thereto without completely closing the at least one dispensing opening.

5. An adapting device for positioning a capsule into a capsule holder, the capsule being designed for delivering a food product by injection of a fluid under pressure into the capsule when the capsule and the capsule holder are inserted into a receptacle of a food preparation machine, the capsule comprising a chamber defined by capsule side walls, a top wall, and a flexible bottom wall, the chamber containing at least one ingredient to be dissolved or extracted by the injection fluid, wherein a beverage dispensing structure comprising at least one dispensing opening disposed through the flexible bottom wall, the adapting device comprising:
a plurality of pillars extending vertically from the flexible bottom wall to an internal wall of the adapting device to hold the flexible bottom wall at a distance from the internal wall of the adapting device, and
a pressure retaining element adapted to retain a certain predetermined dissolution or extraction pressure in the chamber for mixing of the injection fluid with the ingredient, the pressure retaining element being located adjacent the flexible bottom wall outside of the capsule, the pressure retaining element comprising at least one protrusion disposed in correspondence to the at least one dispensing opening so that the at least one protrusion is disposed into the at least one dispensing opening corresponding thereto and that the at least one protrusion restricts a cross section of the at least one dispensing opening corresponding thereto, at least at the time the injection fluid inside the chamber presses onto the flexible bottom wall and moves the flexible bottom wall towards the pressure retaining element, wherein the at least one protrusion has a radial cross-sectional shape that differs from a shape of the at least one dispensing opening corresponding thereto, and wherein the at least one protrusion has a general longitudinal profile such that a radial cross section of the at least one protrusion continually increases from apex to base.

6. The adapting device of claim 5, wherein the at least one protrusion has a general shape selected from the group consisting of: a hemisphere, a truncated hemisphere, an elliptical paraboloid, a thorn-like cone, a polyhedron, a truncated tetrahedron, a cone, a truncated cone, a pyramid, a truncated pyramid, and combinations thereof.

7. The adapting device of claim 5, wherein the pressure retaining element comprises at least one cushion located in the vicinity of the at least one protrusion, the at least one cushion having a height smaller than, or equal to, the at least one protrusion, for maintaining the flexible bottom wall at a distance from a protrusion base when the flexible bottom wall is moved due to fluid pressure inside the capsule, such that a diameter of the at least one dispensing opening is greater than the radial cross-section of the at least one protrusion it corresponds to.

8. The adapting device of claim 5, wherein the at least one protrusion partially fills the cross section of the at least one dispensing opening corresponding thereto without completely closing the at least one dispensing opening.

9. A system comprising:
a beverage preparation machine;
a capsule;
and a capsule holder,
the capsule configured for delivering a food product by injection of a fluid under pressure into the capsule when the capsule and the capsule holder are inserted into a receptacle of the beverage preparation machine, the capsule comprising a chamber defined by capsule side walls, a top wall, and a flexible bottom wall, the chamber containing at least one ingredient to be dissolved or extracted by the injection fluid, wherein a beverage dispensing structure comprising at least one dispensing opening disposed through the flexible bottom wall, and the capsule holder comprising a pressure retaining element and a plurality of pillars extending vertically from the flexible bottom wall to an internal wall of the capsule holder to hold the flexible bottom wall at a distance from the internal wall of the capsule holder, the pressure retaining element adapted to retain a certain predetermined dissolution or extraction pressure in the chamber for mixing of the injection fluid with the ingredient, the pressure retaining element being located adjacent to and below the flexible bottom wall outside of the capsule, the pressure retaining element comprising at least one protrusion positioned in correspondence to the at least one dispensing opening so that the at least one protrusion partially fills a space defined by the at least one dispensing opening corresponding thereto and that the at least one protrusion restricts a cross section of the at least one dispensing opening corresponding thereto, at least at the time the injection fluid inside the chamber presses onto the flexible bottom wall and moves the flexible bottom wall towards the pressure retaining element, wherein the at least one protrusion has a radial cross-sectional shape that differs from a shape of the at least one dispensing opening corresponding thereto, and wherein the at least one protrusion has a general longitudinal profile such that a radial cross section of the at least one protrusion continually increases from apex to base.

10. The system of claim 9, wherein the plurality of pillars are connected to the internal wall of the capsule holder.

11. The system of claim 9, wherein the plurality of pillars are joined together by a plate positioned perpendicularly to a direction of the vertical extension of the plurality of pillars.

12. The system of claim 11, wherein the plate comprises the pressure retaining element.

* * * * *